(12) United States Patent
Yamakawa et al.

(10) Patent No.: US 7,595,938 B2
(45) Date of Patent: Sep. 29, 2009

(54) WIDE-ANGLE IMAGING LENS, IMAGING DEVICE AND CAMERA MODULE

(75) Inventors: Hiromitsu Yamakawa, Saitama (JP); Takashi Suzuki, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 78 days.

(21) Appl. No.: 11/858,799

(22) Filed: Sep. 20, 2007

(65) Prior Publication Data
US 2008/0074761 A1 Mar. 27, 2008

(30) Foreign Application Priority Data
Sep. 21, 2006 (JP) ............... P 2006-255409

(51) Int. Cl.
*G02B 13/04* (2006.01)
*G02B 13/18* (2006.01)
(52) U.S. Cl. .................. 359/752; 359/749; 359/794
(58) Field of Classification Search ......... 359/749–753, 359/708, 713, 794
See application file for complete search history.

(56) References Cited

U.S. PATENT DOCUMENTS

| | | | | |
|---|---|---|---|---|
| 2,824,495 | A | * | 2/1958 | Klemt ............... 359/752 |
| 3,497,291 | A | * | 2/1970 | Woltche ............ 359/752 |
| 6,160,669 | A | | 12/2000 | Nagaoka |
| 7,023,628 | B1 | | 4/2006 | Ning |
| 2003/0076591 | A1 | | 4/2003 | Ohmori et al. |
| 2005/0174463 | A1 | | 8/2005 | Ohzawa et al. |
| 2006/0087747 | A1 | | 4/2006 | Ohzawa et al. |

FOREIGN PATENT DOCUMENTS

| | | |
|---|---|---|
| EP | 1382985 A2 | 1/2004 |
| JP | 4-267212 A | 9/1992 |
| JP | 2599312 B2 | 1/1997 |
| JP | 2003-232998 A | 8/2003 |
| JP | 2005-221920 A | 8/2005 |
| JP | 2006-119368 A | 5/2006 |

* cited by examiner

*Primary Examiner*—Ricky L Mack
*Assistant Examiner*—James R Greece
(74) *Attorney, Agent, or Firm*—Birch, Stewart, Kolasch & Birch, LLP

(57) ABSTRACT

A first lens group having a positive refractive power, an aperture stop, and a second lens group having a positive refractive power are provided in order from an object side. The first lens group includes, in order from the object side, a first lens that is a negative meniscus lens having a convex surface directed toward the object side, a negative second lens whose surface on an image side has a concave shape, and a positive third lens whose surface on the image side has a convex shape directed toward the image side. The second lens group includes, in order from the object side, a positive fourth lens whose surface on the image side has a convex shape directed toward the image side, a negative fifth lens having a biconcave shape, and a positive sixth lens having a biconvex shape. The fifth lens and the sixth lens are cemented together.

9 Claims, 19 Drawing Sheets

EXAMPLE 2

EXAMPLE 1

EXAMPLE 2

FIG. 4 EXAMPLE 4

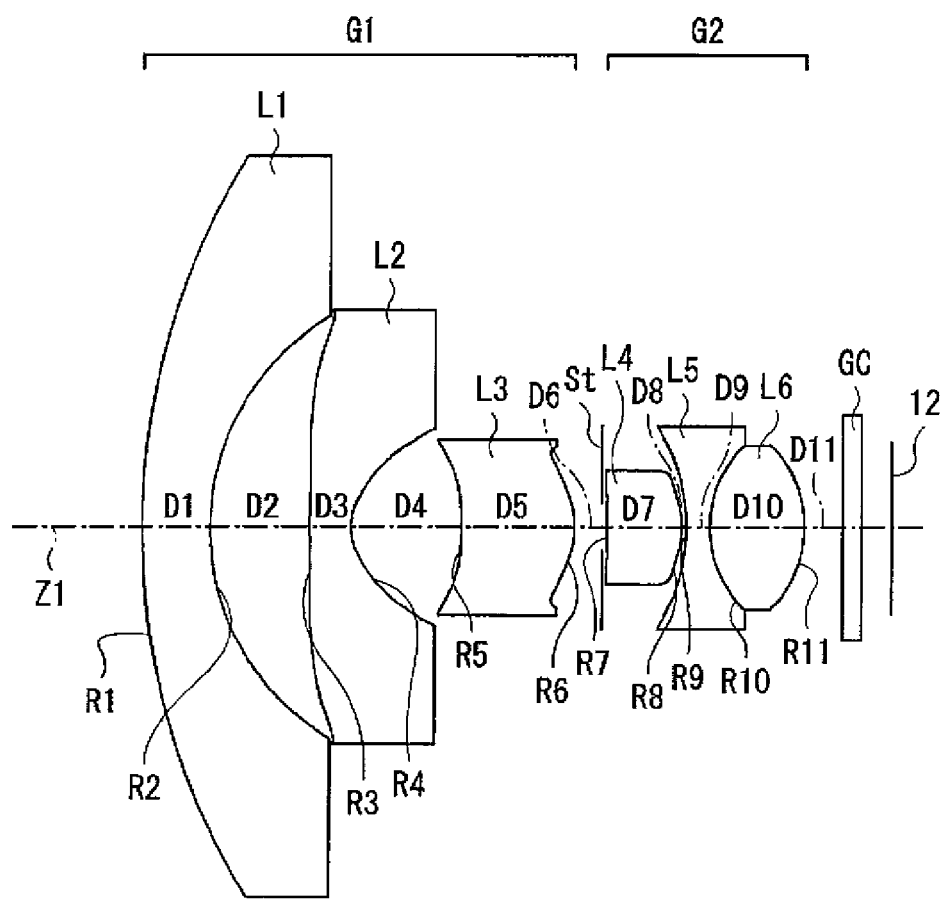

| | EXAMPLE 1 BASIC LENS DATA | | | | |
|---|---|---|---|---|---|
| | Si | Ri | Di | Nej | νdj |
| G1 | 1 | 12.382 | 1.01 | 1.82017 | 46.6 |
| | 2 | 4.741 | 2.35 | | |
| | 3 | 17.781 | 1.00 | 1.53387 | 55.5 |
| | 4 | 1.047 | 2.04 | | |
| | 5 | −21.106 | 2.65 | 1.58820 | 30.3 |
| | 6 | −2.130 | 0.98 | | |
| G2 | 7 | 4.696 | 1.39 | 1.51222 | 56.2 |
| | 8 | −1.572 | 0.13 | | |
| | 9 | −3.047 | 0.58 | 1.93429 | 18.9 |
| | 10 | 2.586 | 2.02 | 1.75844 | 52.3 |
| | 11 | −2.586 | | | |

(B)

| | EXAMPLE 1 ASPHERIC SURFACE LENS DATA | | | | | |
|---|---|---|---|---|---|---|
| C* | SURFACE NUMBER | | | | | |
| | S3 | S4 | S5 | S6 | S7 | S8 |
| K | 0 | 0 | 0 | 0 | 0 | 0 |
| B3 | −7.5731E−02 | −1.1163E−01 | 1.0178E−02 | 1.8074E−02 | 7.0481E−02 | 1.1500E−01 |
| B4 | 2.7139E−02 | 5.0487E−02 | −2.8929E−02 | −1.8848E−02 | 7.4647E−01 | −3.2512E−01 |
| B5 | 2.1696E−03 | −2.2919E−02 | −2.7592E−02 | 1.0458E−02 | −6.7491E+00 | 6.1896E−01 |
| B6 | −8.2839E−04 | 8.5920E−03 | 1.4321E−03 | 1.5218E−02 | 1.9964E+01 | −2.7843E−01 |
| B7 | −3.2749E−04 | 6.5956E−03 | 2.1223E−02 | −1.2437E−03 | −1.9853E+01 | −7.0979E−02 |
| B8 | −4.7757E−06 | 1.4300E−03 | 1.2410E−02 | −5.9195E−03 | −4.2644E+00 | 3.8277E−02 |
| B9 | 1.0099E−05 | 3.2690E−04 | −1.0552E−02 | −6.6615E−03 | 9.1091E−01 | 4.7330E−02 |
| B10 | 4.9907E−06 | −1.9641E−05 | −1.5766E−02 | −2.9225E−03 | 2.5564E+01 | 2.7826E−02 |
| B11 | 8.5645E−07 | −8.2635E−05 | 4.4978E−03 | 1.3036E−03 | −2.9385E+00 | −1.1554E−03 |
| B12 | −4.4074E−07 | −9.7634E−05 | 4.2437E−03 | 3.2999E−03 | −5.3772E+00 | −1.6646E−02 |
| B13 | −3.9562E−08 | −8.1495E−05 | 9.9730E−04 | 3.0394E−03 | −1.2680E+01 | −2.1707E−02 |
| B14 | 5.2522E−09 | −5.0939E−05 | −2.9534E−04 | 7.1431E−04 | −4.0394E+00 | −1.7373E−02 |
| B15 | 3.7457E−10 | −2.0742E−05 | −5.3729E−04 | −6.9878E−04 | −7.9194E−01 | −9.9341E−03 |
| B16 | 3.1362E−10 | −2.2329E−06 | −2.8420E−04 | −1.9345E−03 | −4.7768E−01 | −1.4878E−03 |
| B17 | 3.3315E−11 | 4.9194E−06 | −8.8656E−06 | −9.7009E−04 | −6.8082E−03 | 4.9461E−03 |
| B18 | −2.0635E−12 | 5.1037E−06 | 8.5683E−05 | 4.9790E−04 | 5.6824E−02 | 8.9088E−03 |
| B19 | −1.7212E−12 | 2.4475E−06 | 5.7562E−05 | 1.0924E−03 | 2.1161E−02 | 6.0295E−03 |
| B20 | −8.0025E−14 | −1.4942E−06 | −2.7435E−05 | −4.6182E−04 | 2.3296E−03 | −5.6669E−03 |

C*: coefficient

| | | EXAMPLE 2 BASIC LENS DATA | | | |
|---|---|---|---|---|---|
| | Si | Ri | Di | Nej | νdj |
| G1 | 1 | 15.565 | 1.50 | 1.77621 | 46.6 |
| | 2 | 5.613 | 2.48 | | |
| | 3 | 6.057 | 1.00 | 1.53387 | 55.5 |
| | 4 | 1.079 | 2.10 | | |
| | 5 | -7.520 | 2.80 | 1.58820 | 30.3 |
| | 6 | -2.138 | 0.78 | | |
| G2 | 7 | -36.340 | 1.52 | 1.51222 | 56.2 |
| | 8 | -1.379 | 0.15 | | |
| | 9 | -4.055 | 0.60 | 1.93429 | 18.9 |
| | 10 | 2.586 | 2.02 | 1.75844 | 52.3 |
| | 11 | -2.586 | | | |

(B)

| | EXAMPLE 2 ASPHERIC SURFACE LENS DATA | | | | | |
|---|---|---|---|---|---|---|
| | SURFACE NUMBER | | | | | |
| C* | S3 | S4 | S5 | S6 | S7 | S8 |
| K | 0 | 0 | 0 | 0 | 0 | 0 |
| B3 | -8.6855E-02 | -1.2037E-01 | 4.9688E-03 | 1.4112E-03 | -8.1535E-02 | 1.1811E-01 |
| B4 | 2.5213E-02 | 4.9671E-02 | -3.0670E-02 | 1.2189E-03 | 1.1060E+00 | -3.4785E-01 |
| B5 | 2.1654E-03 | -2.4073E-02 | -1.9197E-02 | 2.0531E-02 | -7.1047E+00 | 5.8689E-01 |
| B6 | -8.1032E-04 | 1.2911E-02 | 7.0993E-03 | 9.0924E-03 | 2.0616E+01 | -2.7284E-01 |
| B7 | -2.6233E-04 | 2.8779E-03 | 1.9698E-02 | -1.2059E-02 | -2.0355E+01 | -1.1705E-01 |
| B8 | 1.3849E-06 | -1.1406E-03 | 6.4236E-03 | -9.5613E-03 | -6.1824E+00 | 4.3049E-02 |
| B9 | 1.1459E-05 | -9.5228E-04 | -1.4661E-02 | -4.8714E-03 | -1.0114E+00 | 5.0573E-02 |
| B10 | 3.7852E-06 | -8.8963E-05 | -1.1483E-02 | 1.3837E-03 | 2.5724E+01 | 2.9987E-02 |
| B11 | 6.3230E-07 | 2.4664E-04 | 6.7789E-03 | 4.9313E-03 | 7.4302E+00 | 4.2968E-03 |
| B12 | -5.2400E-07 | 1.8458E-04 | 3.9213E-03 | 5.2335E-03 | 8.0085E+00 | -4.4516E-03 |
| B13 | -1.3017E-08 | 3.8716E-05 | 5.3965E-04 | 2.2138E-03 | -2.0455E+00 | -7.3222E-03 |
| B14 | 1.0648E-08 | -2.9471E-05 | -6.4151E-04 | -8.6721E-04 | -2.2464E+01 | -6.0217E-03 |
| B15 | 7.8151E-10 | -3.2082E-05 | -5.9019E-04 | -2.7939E-03 | -2.8080E+01 | -6.5539E-03 |
| B16 | 1.8909E-10 | -1.4330E-05 | -2.3465E-04 | -2.1110E-03 | -5.5621E+01 | -8.1810E-03 |
| B17 | -1.6341E-11 | -7.7645E-07 | 3.7456E-05 | -1.5098E-04 | -6.9309E+01 | -6.1089E-03 |
| B18 | -9.5835E-12 | 3.9418E-06 | 9.8006E-05 | 1.3036E-03 | -2.6356E+01 | 1.4129E-02 |
| B19 | -1.1727E-12 | 2.8323E-06 | 5.1582E-05 | 6.1337E-04 | 1.1191E+02 | 6.8919E-04 |
| B20 | 2.8354E-13 | -1.1110E-06 | -2.9960E-05 | -4.4327E-04 | 2.1716E+02 | -2.2830E-03 |

C*: coefficient

| | EXAMPLE 3 BASIC LENS DATA | | | | |
|---|---|---|---|---|---|
| | Si | Ri | Di | Nej | νdj |
| G1 | 1 | 15.600 | 1.50 | 1.77621 | 46.6 |
| | 2 | 5.494 | 2.63 | | |
| | 3 | 7.540 | 1.00 | 1.53387 | 55.5 |
| | 4 | 1.042 | 2.21 | | |
| | 5 | 27.239 | 3.01 | 1.58820 | 30.3 |
| | 6 | -2.233 | 0.64 | | |
| G2 | 7 | -3.981 | 1.53 | 1.57101 | 56.2 |
| | 8 | -1.430 | 0.15 | | |
| | 9 | -4.977 | 0.60 | 1.93429 | 18.9 |
| | 10 | 2.610 | 2.00 | 1.75844 | 52.3 |
| | 11 | -2.610 | | | |

(B)

| | EXAMPLE 3 ASPHERIC SURFACE LENS DATA | | | | | |
|---|---|---|---|---|---|---|
| C* | SURFACE NUMBER | | | | | |
| | S3 | S4 | S5 | S6 | S7 | S8 |
| K | 0 | 0 | 0 | 0 | 0 | 0 |
| B3 | -8.7423E-02 | -1.3332E-01 | 9.8501E-03 | 1.3762E-03 | 1.4917E-01 | 1.3744E-01 |
| B4 | 2.5283E-02 | 5.0908E-02 | -3.2117E-02 | -1.3135E-02 | 2.7500E-01 | -3.9990E-01 |
| B5 | 2.1920E-03 | -2.4736E-02 | -1.9217E-02 | 2.9979E-02 | -6.5058E+00 | 5.4822E-01 |
| B6 | -8.0494E-04 | 1.2578E-02 | 8.2315E-03 | 1.3449E-02 | 2.1986E+01 | -2.1600E-01 |
| B7 | -2.6166E-04 | 2.8417E-03 | 2.0484E-02 | -1.5422E-02 | -2.0087E+01 | -5.1796E-02 |
| B8 | 1.2944E-06 | -1.1073E-03 | 6.5581E-03 | -1.3239E-02 | -8.7479E+00 | 1.1098E-02 |
| B9 | 1.1374E-05 | -9.2235E-04 | -1.4990E-02 | -6.1492E-03 | -6.2665E+00 | -5.2943E-03 |
| B10 | 3.7501E-06 | -7.3924E-05 | -1.1854E-02 | 1.4040E-03 | 2.1641E+01 | 1.1121E-02 |
| B11 | 6.2225E-07 | 2.5251E-04 | 6.5719E-03 | 5.8607E-03 | 1.1306E+01 | 1.2803E-02 |
| B12 | -5.2601E-07 | 1.8635E-04 | 3.8835E-03 | 4.4577E-03 | 2.6444E+01 | 9.4613E-03 |
| B13 | -1.3084E-08 | 3.9016E-05 | 5.8233E-04 | 2.4802E-03 | 3.1919E+01 | 2.3576E-03 |
| B14 | 1.0767E-08 | -2.9554E-05 | -5.9612E-04 | 5.7790E-04 | 2.4659E+01 | -6.9553E-04 |
| B15 | 8.4043E-10 | -3.2165E-05 | -5.6804E-04 | -2.2032E-03 | -3.5847E+01 | -2.7008E-03 |
| B16 | 2.0328E-10 | -1.4359E-05 | -2.3200E-04 | -2.4096E-03 | -1.6258E+02 | -3.4872E-03 |
| B17 | -1.5245E-11 | -7.7770E-07 | 3.1908E-05 | -5.3695E-04 | -3.3427E+02 | -4.0867E-03 |
| B18 | -1.0906E-11 | 3.9468E-06 | 9.1309E-05 | 1.0767E-03 | -4.4206E+02 | -2.4680E-03 |
| B19 | -1.6474E-12 | 2.8332E-06 | 4.8125E-05 | 5.0529E-04 | 1.8568E+02 | -2.5392E-04 |
| B20 | 3.8885E-13 | -1.1157E-06 | -2.6828E-05 | -2.7594E-04 | 1.4034E+03 | 2.5895E-03 |

C*: coefficient

| | Si | Ri | Di | Nej | νdj |
|---|---|---|---|---|---|
| G1 | 1 | 15.565 | 1.52 | 1.77621 | 46.6 |
| | 2 | 5.613 | 2.28 | | |
| | 3 | 6.674 | 1.00 | 1.53387 | 55.5 |
| | 4 | 1.147 | 2.54 | | |
| | 5 | -7.623 | 2.80 | 1.58820 | 30.3 |
| | 6 | -2.103 | 0.76 | | |
| G2 | 7 | -26.693 | 1.51 | 1.51222 | 56.2 |
| | 8 | -1.523 | 0.15 | | |
| | 9 | -4.055 | 0.60 | 1.93429 | 18.9 |
| | 10 | 2.586 | 2.02 | 1.75844 | 52.3 |
| | 11 | -2.586 | | | |

EXAMPLE 4 BASIC LENS DATA (B)

EXAMPLE 4 ASPHERIC SURFACE LENS DATA

| C* | SURFACE NUMBER | | | | | |
|---|---|---|---|---|---|---|
| | S3 | S4 | S5 | S6 | S7 | S8 |
| K | 0 | 0 | 0 | 0 | 0 | 0 |
| B3 | -8.7115E-02 | -1.0524E-01 | 3.9701E-03 | -1.4943E-03 | 6.0910E-02 | 1.2587E-01 |
| B4 | 2.5250E-02 | 4.4985E-02 | -3.0649E-02 | -1.8973E-04 | 7.3119E-01 | -3.6186E-01 |
| B5 | 2.1784E-03 | -2.6833E-02 | -1.9911E-02 | 2.1043E-02 | -7.0945E+00 | 5.8482E-01 |
| B6 | -8.0770E-04 | 1.2245E-02 | 6.2966E-03 | 1.0101E-02 | 2.1148E+01 | -2.6142E-01 |
| B7 | -2.6195E-04 | 2.8857E-03 | 1.9184E-02 | -1.1633E-02 | -1.9686E+01 | -1.0863E-01 |
| B8 | 1.4075E-06 | -1.0354E-03 | 6.2110E-03 | -9.6212E-03 | -6.0240E+00 | 4.1384E-02 |
| B9 | 1.1449E-05 | -8.8226E-04 | -1.4683E-02 | -5.2014E-03 | -2.0164E+00 | 4.5443E-02 |
| B10 | 3.7798E-06 | -5.6989E-05 | -1.1424E-02 | 1.1431E-03 | 2.3235E+01 | 2.5521E-02 |
| B11 | 6.3045E-07 | 2.5797E-04 | 6.8493E-03 | 4.9621E-03 | 3.9024E+00 | 7.7579E-04 |
| B12 | -5.2452E-07 | 1.8743E-04 | 3.9734E-03 | 5.1946E-03 | 5.1575E+00 | -7.0661E-03 |
| B13 | -1.3147E-08 | 3.8852E-05 | 5.6802E-04 | 2.2233E-03 | -9.0102E-01 | -8.8799E-03 |
| B14 | 1.0618E-08 | -2.9872E-05 | -6.3185E-04 | -6.6518E-04 | -1.2816E+01 | -6.1976E-03 |
| B15 | 7.7535E-10 | -3.2403E-05 | -5.9105E-04 | -2.7386E-03 | -6.5696E+00 | -5.4413E-03 |
| B16 | 1.8798E-10 | -1.4493E-05 | -2.3940E-04 | -2.2068E-03 | -2.6065E+01 | -6.0451E-03 |
| B17 | -1.6484E-11 | -8.3625E-07 | 3.2884E-05 | -2.2581E-04 | -5.2791E+01 | -3.4277E-03 |
| B18 | -9.5778E-12 | 3.9295E-06 | 9.5275E-05 | 1.2917E-03 | -6.7287E+01 | 1.6152E-02 |
| B19 | -1.1583E-12 | 2.8357E-06 | 5.1011E-05 | 5.7853E-04 | -1.1054E+01 | 1.1290E-03 |
| B20 | 2.9141E-13 | -1.1051E-06 | -2.8692E-05 | -3.8595E-04 | 2.6843E+02 | -4.3562E-03 |

C*: coefficient

| | EXAMPLE 5 BASIC LENS DATA | | | | |
|---|---|---|---|---|---|
| | Si | Ri | Di | Nej | νdj |
| G1 | 1 | 15.600 | 1.50 | 1.77621 | 46.6 |
| | 2 | 5.439 | 2.47 | | |
| | 3 | 6.737 | 1.00 | 1.53387 | 55.5 |
| | 4 | 1.117 | 2.50 | | |
| | 5 | -12.180 | 3.00 | 1.58820 | 30.3 |
| | 6 | -2.102 | 0.72 | | |
| G2 | 7 | -12.204 | 1.52 | 1.51222 | 56.2 |
| | 8 | -1.581 | 0.15 | | |
| | 9 | -4.385 | 0.60 | 1.93429 | 18.9 |
| | 10 | 2.615 | 2.00 | 1.75844 | 52.3 |
| | 11 | -2.615 | | | |

(B)

| | EXAMPLE 5 ASPHERIC SURFACE LENS DATA | | | | | |
|---|---|---|---|---|---|---|
| C* | SURFACE NUMBER | | | | | |
| | S3 | S4 | S5 | S6 | S7 | S8 |
| K | 0 | 0 | 0 | 0 | 0 | 0 |
| B3 | -8.7145E-02 | -1.0494E-01 | 5.2635E-03 | 2.4047E-03 | 6.2531E-02 | 1.2856E-01 |
| B4 | 2.5249E-02 | 4.4407E-02 | -2.9524E-02 | -2.6489E-03 | 7.7387E-01 | -3.7730E-01 |
| B5 | 2.1788E-03 | -2.6773E-02 | -1.9126E-02 | 1.8998E-02 | -7.1703E+00 | 5.8178E-01 |
| B6 | -8.0762E-04 | 1.2463E-02 | 6.7887E-03 | 1.1767E-02 | 2.1077E+01 | -2.4045E-01 |
| B7 | -2.6202E-04 | 3.0456E-03 | 1.9410E-02 | -8.7840E-03 | -1.9628E+01 | -9.5794E-02 |
| B8 | 1.3539E-06 | -9.5404E-04 | 6.2237E-03 | -8.6528E-03 | -5.8401E+00 | 2.9539E-02 |
| B9 | 1.1426E-05 | -8.4955E-04 | -1.4793E-02 | -6.2044E-03 | -1.7855E+00 | 3.2611E-02 |
| B10 | 3.7723E-06 | -4.7557E-05 | -1.1564E-02 | -5.0156E-04 | 2.3380E+01 | 2.2138E-02 |
| B11 | 6.2868E-07 | 2.5876E-04 | 6.7398E-03 | 3.3278E-03 | 3.7897E+00 | 2.6002E-03 |
| B12 | -5.2478E-07 | 1.8597E-04 | 3.9168E-03 | 4.4245E-03 | 4.6016E+00 | -4.4732E-03 |
| B13 | -1.3124E-08 | 3.7376E-05 | 5.5317E-04 | 2.6398E-03 | -2.0217E+00 | -7.0808E-03 |
| B14 | 1.0650E-08 | -3.0840E-05 | -6.2630E-04 | 4.0754E-04 | -1.4448E+01 | -5.2486E-03 |
| B15 | 7.8795E-10 | -3.2915E-05 | -5.8132E-04 | -1.6303E-03 | -8.3227E+00 | -4.9820E-03 |
| B16 | 1.9093E-10 | -1.4717E-05 | -2.3284E-04 | -2.4324E-03 | -2.6770E+01 | -5.7493E-03 |
| B17 | -1.6315E-11 | -9.1136E-07 | 3.5811E-05 | -4.9175E-04 | -5.0287E+01 | -3.1591E-03 |
| B18 | -9.7933E-12 | 3.9187E-06 | 9.5916E-05 | 1.1362E-03 | -5.7286E+01 | 1.6440E-02 |
| B19 | -1.2453E-12 | 2.8461E-06 | 5.0738E-05 | 4.7558E-04 | 1.9370E+01 | 1.2296E-03 |
| B20 | 3.0714E-13 | -1.0914E-06 | -2.9172E-05 | -3.0207E-04 | 2.3625E+02 | -4.8610E-03 |

C*: coefficient

| EXAMPLE 6 BASIC LENS DATA ||||||
|---|---|---|---|---|---|
| | Si | Ri | Di | Nej | νdj |
| G1 | 1 | 18.713 | 1.80 | 1.77621 | 46.6 |
| G1 | 2 | 6.554 | 2.61 | | |
| G1 | 3 | 7.824 | 1.10 | 1.53387 | 55.5 |
| G1 | 4 | 1.291 | 2.95 | | |
| G1 | 5 | -8.032 | 3.00 | 1.58820 | 30.3 |
| G1 | 6 | -2.197 | 0.85 | | |
| G2 | 7 | -94.291 | 1.97 | 1.51222 | 56.2 |
| G2 | 8 | -2.005 | 0.12 | | |
| G2 | 9 | -5.069 | 0.60 | 1.93429 | 18.9 |
| G2 | 10 | 3.093 | 2.50 | 1.75844 | 52.3 |
| G2 | 11 | -3.093 | | | |

(B)

| EXAMPLE 6 ASPHERIC SURFACE LENS DATA |||||||
|---|---|---|---|---|---|---|
| C* | SURFACE NUMBER ||||||
| | S3 | S4 | S5 | S6 | S7 | S8 |
| K | 0 | 0 | 0 | 0 | 0 | 0 |
| B3 | -5.5357E-02 | -8.6418E-02 | 1.5630E-03 | 1.5542E-02 | 7.7973E-02 | 5.6408E-02 |
| B4 | 1.2945E-02 | 2.4966E-02 | -1.8161E-02 | 1.1778E-03 | 3.7769E-01 | -1.6673E-01 |
| B5 | 8.8814E-04 | -8.9196E-03 | -8.7534E-03 | 6.9082E-03 | -2.9762E+00 | 2.5499E-01 |
| B6 | -2.6640E-04 | 4.5783E-03 | 2.3439E-03 | 2.7107E-03 | 6.8738E+00 | -8.2450E-02 |
| B7 | -6.9090E-05 | 7.8020E-04 | 5.3650E-03 | -2.9474E-03 | -5.0874E+00 | -2.9228E-02 |
| B8 | 2.2040E-07 | -2.7725E-04 | 1.4785E-03 | -1.8094E-03 | -1.0401E+00 | 8.6501E-03 |
| B9 | 1.9108E-06 | -1.8739E-04 | -2.4105E-03 | -7.2864E-04 | -8.1874E-02 | 7.8264E-03 |
| B10 | 5.0646E-07 | -2.4022E-05 | -1.5317E-03 | 2.0713E-04 | 3.2016E+00 | 3.1158E-03 |
| B11 | 6.7756E-08 | 2.2649E-05 | 7.2587E-04 | 5.1606E-04 | 1.1727E-01 | -8.0527E-04 |
| B12 | -4.5002E-08 | 1.5123E-05 | 3.3392E-04 | 4.3048E-04 | -3.1823E-01 | -1.5925E-03 |
| B13 | -8.8607E-10 | 2.7664E-06 | 3.5527E-05 | 1.3962E-04 | -1.1128E+00 | -1.2635E-03 |
| B14 | 5.8806E-10 | -1.4241E-06 | -3.5772E-05 | -5.3941E-05 | -1.5676E+00 | -4.9002E-04 |
| B15 | 3.5017E-11 | -1.2881E-06 | -2.5994E-05 | -1.2467E-04 | -2.0027E-01 | 3.9828E-05 |
| B16 | 6.7793E-12 | -4.4943E-07 | -8.1766E-06 | -7.2404E-05 | 9.3678E-01 | 2.7841E-04 |
| B17 | -4.4106E-13 | -3.9704E-09 | 1.1179E-06 | -2.6067E-06 | 2.6239E+00 | 3.9634E-04 |
| B18 | -2.1465E-13 | 9.1823E-08 | 2.2323E-06 | 3.0098E-05 | 3.9132E+00 | 6.2683E-04 |
| B19 | -2.1730E-14 | 4.9883E-08 | 9.2951E-07 | 1.1198E-05 | 1.2463E+00 | -2.6204E-05 |
| B20 | 3.7267E-15 | -1.7543E-08 | -4.4149E-07 | -6.5915E-06 | -1.0220E+01 | -4.1126E-04 |

C*: coefficient

FIG. 13

| | f | EQ.(1) f2/f | EQ.(2) f3/f | EQ.(3) f5/f | EQ.(4) fb/f | EQ.(5) f12/f | EQ.(6) Y80/Y40 |
|---|---|---|---|---|---|---|---|
| | VALUES CONCERNING CONDITIONAL EXPRESSIONS |||||||
| EXAMPLE 1 | 0.85 | -2.512 | 4.519 | -1.683 | 3.959 | -1.693 | 2.262 |
| EXAMPLE 2 | 0.87 | -3.040 | 4.899 | -1.863 | 3.518 | -2.095 | 2.257 |
| EXAMPLE 3 | 0.86 | -2.799 | 4.265 | -2.065 | 3.517 | -1.956 | 2.246 |
| EXAMPLE 4 | 0.89 | -3.116 | 4.677 | -1.822 | 3.585 | -2.159 | 2.254 |
| EXAMPLE 5 | 0.87 | -3.184 | 4.634 | -2.006 | 3.830 | -2.213 | 2.228 |
| EXAMPLE 6 | 1.07 | -2.873 | 4.033 | -1.854 | 3.723 | -2.020 | 2.250 |

EXAMPLE 2

FNo.=3.2    ω=92.5°    ω=92.5°    ω=92.5°

-0.25mm 0.25mm    -0.25mm 0.25mm    -5% 5%    -10μm 10μm

SPHERICAL ABERRATION (A)    ASTIGMATISM (B)    DISTORTION (C)    LATERAL CHROMATIC ABERRATION (D)

EXAMPLE 2

(A) ω=92.5°

(B) ω=75.8°

(C) ω=0°

EXAMPLE 4

EXAMPLE 4

EXAMPLE 5

EXAMPLE 5

WIDE-ANGLE IMAGING LENS, IMAGING DEVICE AND CAMERA MODULE

CROSS-REFERENCE TO RELATED APPLICATIONS

This application is based upon and claims the benefit of priority from the Japanese Patent Application No. 2006-255409 filed on Sep. 21, 2006, the entire contents of which are incorporated herein by reference.

BACKGROUND OF THE INVENTION

1. Technical Field

The invention relates to a wide-angle imaging lens installed into a camera mounted on a vehicle, a mobile phone camera, a surveillance camera, and the like using an imaging device such as CCD (Charge Coupled Device) or CMOS (Complementary Metal Oxide Semiconductor), and an imaging device and a camera module for converting an optical image captured by the wide-angle imaging lens into an imaging signal.

2. Description of the Related Art

In order to shoot a wide range, a superwide-angle type shooting lens having a wide angle of view is used in a surveillance camera and a camera mounted on a vehicle. In order to further accomplish a superwide angle, the number of lenses tends to increase. However, Patent Documents 1 to 4 (see below) disclose a wide angle lens in which a relatively small number of lenses, i.e., six lenses in total are employed to attempt to attain a size reduction and a weight reduction while aspheric lenses are used effectively to keep good optical performance. The wide-angle lenses disclosed in Patent Documents 1 to 4 are constructed such that first to third lenses are arranged on the front side to put an aperture stop therebetween and that fourth to sixth lenses are arranged on the image side. In these wide-angle lenses, a cemented lens is used to correct a chromatic aberration. In particular, in the wide-angle lenses disclosed in Patent Documents 1 to 3, the fourth lens and the fifth lens located close to the aperture stop are formed of the cemented lens. In this case, the fourth lens is a negative lens and the fifth lens is a positive lens. In the wide angle lens disclosed in Patent Document 4, the fifth lens and the sixth lens located away from the aperture stop are formed of the cemented lens. In this case, the fifth lens is a negative meniscus lens and the sixth lens is a biconvex lens. Also, in the wide angle lens disclosed in Patent Document 4, a surface located closest to the image side (the surface of the sixth lens on the image side) is formed into the aspheric surface.

[Patent Document 1] JP 2003-232998 A

[Patent Document 2] JP 2005-221920 A
(corresponding to US 2005/0174463 A)

[Patent Document 3] JP 2006-119368 A
(corresponding to US 2006/0087747 A)

[Patent Document 4] Japanese Patent No. 2599312

However, in the wide-angle imaging lenses disclosed in the above Patent Documents, the maximum angle of view is 150° or so. Hence, it is demanded to realize a lens having a wider angle of view, e.g., a lens in which a further increase of a super-wide angle is achieved to get the maximum angle of view of 180° or more. In this case, it is desirable that a small-size and lightweight configuration is still kept without increase in the number of lenses.

SUMMARY OF THE INVENTION

The invention has been made in view of the above circumstances, and provides a wide-angle imaging lens of small size and lightweight, which can attain a further increase of a super-wide angle while maintaining good optical performances and which is suitable for surveillance use, on-vehicle use, etc., and an imaging device and a camera module capable of outputting an imaging signal of high resolution by installing the wide-angle imaging lens.

According to a first aspect of the invention, a wide-angle imaging lens includes, in order from an object side, a first lens group having a positive refractive power, an aperture stop and a second lens group having a positive refractive power. The first lens group includes first to third lenses in order from the object side. The first lens is a negative meniscus lens having a convex surface directed to the object side. A surface of the negative second lens on an image side has a concave shape. A surface of the positive third on the image side has a convex shape directed to the image side. The second lens group comprises fourth to sixth lenses in order from the object side. A surface of the positive fourth lens on the image side has a convex shape directed to the image side. The negative fifth lens has a biconcave shape. The positive sixth lens has a biconvex shape.

In the wide-angle imaging lens according to the first aspect of the invention, the following Conditional Expressions (1) to (5) may be satisfied:

$$-4.0 < f2/f < -2.0 \tag{1}$$

$$3.5 < f3/f < 6.0 \tag{2}$$

$$-2.5 < f5/f < -1.5 \tag{3}$$

$$3.0 < fb/f < 5.0 \tag{4}$$

$$-3.0 < f12/f < -1.2 \tag{5}$$

where f denotes a focal length of the wide-angle imaging lens, f2 denotes a focal length of the second lens, f3 denotes a focal length of the third lens, f5 denotes a focal length of the fifth lens, fb denotes a composite focal length of the second lens group, and f12 denotes a composite focal length of the first lens and the second lens.

In the wide-angle imaging lens according to the first aspect of the invention, since the shapes of respective lenses and the arrangement of respective lenses can be optimized by using the relatively small number of lenses, i.e., six lenses in total, a size reduction and a weight reduction can be facilitated while maintaining the good optical performances. Also, a further increase of a super-wide angle suitable for the surveillance use, the on-vehicle use, and the like can be realized. Particularly, in the second lens group, the fifth lens and the sixth lens both being located at a remote position from the aperture stop are formed of the biconcave negative lens and the biconvex positive lens, respectively. Therefore, this wide-angle imaging lens is advantageous in correcting a lateral chromatic aberration, and generation of a lateral chromatic aberration due to an increase of angle of view can be suppressed. Also, in particular, since Conditional Expressions (1) to (5) are satisfied, a power balance among the respective lenses is optimized. Thus, this condition is advantageous in correcting various aberrations including an axial chromatic aberration and a lateral chromatic aberration, and generation of aberrations caused by an increase of a wide angle can be suppressed.

According to a second aspect of the invention, a wide-angle imaging lens includes, in order from an object side, a first lens group having a positive refractive power, an aperture stop and a second lens group having a positive refractive power. The first lens group includes first to third lenses in order from the object side. The first lens that is a negative meniscus lens having a convex surface directed to the object side. A surface of the negative second lens on an image side has a concave shape. A surface of the positive third lens on the image side has a convex shape directed to the image side. The second lens group includes a positive fourth lens whose surface on the image side has a convex shape directed to the image side, a negative fifth lens having a biconcave shape, and a positive sixth lens. The following Conditional Expressions (1) to (5) are satisfied:

$$-4.0 < f2/f < -2.0 \tag{1}$$

$$3.5 < f3/f < 6.0 \tag{2}$$

$$-2.5 < f5/f < -1.5 \tag{3}$$

$$3.0 < fb/f < 5.0 \tag{4}$$

$$-3.0 < f12/f < -1.2 \tag{5}$$

where f denotes a focal length of the wide-angle imaging lens,
f2 denotes a focal length of the second lens,
f3 denotes a focal length of the third lens,
f5 denotes a focal length of the fifth lens,
fb denotes a composite focal length of the second lens group, and
f12 denotes a composite focal length of the first lens and the second lens.

In the wide-angle imaging lens according to the second aspect of the invention, the shapes and the refractive powers of the respective lenses are optimized by using the relatively small number of lenses, i.e., six lenses in total. Therefore, a size reduction and a weight reduction can be achieved easily while maintaining the good optical performances. Also, a further increase of a super-wide angle suitable for the surveillance use, the on-vehicle use, and the like can be realized. In particular, since Conditional Expressions (1) to (5) are satisfied, a power balance among the respective lenses is optimized. Thus, this condition is advantageous in correcting various aberrations including an axial chromatic aberration and a lateral chromatic aberration, and generation of aberrations caused by an increase of a wide angle can be suppressed.

In the wide-angle imaging lens according to the first and second aspects of the invention, Abbe numbers of materials of the first lens and the sixth lens may be equal to or larger than 40. Abbe numbers of material of the second lens and the fourth lens may be equal to or larger than 50. Abbe number of a material of the third lens may be equal to or less than 40. Abbe number of a material of the fifth lens may be equal to or less than 30.

This configuration is more advantageous in correcting the axial chromatic aberration and the lateral chromatic aberration. Also, the better resolution performance can be obtained.

Also, in the wide-angle imaging lens according to the first and second aspects of the invention, the fifth lens and the sixth lens may be cemented together.

In the case of this configuration, since the fifth lens L5 and the sixth lens L6 being arranged in the positions apart from the aperture stop constitute the cemented lens, such configuration is advantageous particularly in correcting of the lateral chromatic aberration.

In the wide-angle imaging lens according to the first and second aspects of the invention, an angle of view may be 180° or more. The following Conditional Expression (6) is satisfied:

$$Y80/Y40 > 2.1 \tag{6}$$

where Y80 denotes an image height at an angle of view which is equal to 80% of a maximum angle of view, and
Y40 denotes an image height at an angle of view which is equal to 40% of the maximum angle of view.

In this case, an image of a subject in the peripheral portion that needs a large angle of view becomes larger than that in the center portion that needs a small angle of view. Therefore, it is possible to perform shooting that is suitable for the surveillance camera, the in-vehicle camera, and the like, which attach importance to a discrimination of the surrounding distant subjects.

In the wide-angle imaging lens according to the first and second aspects of the invention, at least one surface of each of the second lens, the third lens, and the fourth lens may be an aspheric surface.

Thereby, the shapes of the second lens, the third lens, and the fourth lens are optimized, which is more advantageous in correcting various aberrations.

According to a third aspect of the invention, an imaging device includes the wide-angle imaging lens according to the first or second aspect of the invention and an imaging element. The imaging element outputs an electric signal in response to an optical image formed by the wide-angle imaging lens.

In this imaging device, the imaging signal of high resolution can be obtained based on the optical image of high resolution obtained by the wide-angle imaging lens of the first or second aspect of the invention.

According to a fourth aspect of the invention, a camera module is fitted into a camera main body. The camera module includes the wide-angle imaging lens according to the first or second aspect of the invention, an imaging element, and an external connection terminal. The imaging element outputs an electric signal in response to an optical image formed by the wide-angle imaging lens. The external connection terminal connects the imaging element to a circuit of a camera main body. The wide-angle imaging lens, the imaging element, and the external connection terminal are integrated together.

In this camera module, the imaging signal of high resolution can be obtained based on the optical image of high resolution obtained by the wide-angle imaging lens according to the first or second aspect of the invention, and the imaging signal is output to the circuit of the camera main body. The high-resolution image can be obtained based on the imaging signal in the camera main body.

In the wide-angle imaging lens according to the first or second aspect of the invention, the shapes of the respective lenses, the arrangements of the respective lenses, and the like are optimized by using the relatively small number of lenses, i.e., six lenses in total. Thereby, a further increase of a super-wide angle suitable for the surveillance use, the on-vehicle use, and the like can be realized in small size and light weight while maintaining the good optical performances.

Also, in the imaging device and the camera module, the electric signal is output in response to the optical image formed by the high-performance wide-angle imaging lens. Therefore, the imaging signal of high resolution can be obtained.

BRIEF DESCRIPTION OF THE DRAWINGS

FIG. 6 is a lens sectional view showing a wide-angle imaging lens according to Example 6 of the invention.

FIG. 7 is tables showing lens data of the wide-angle imaging lens according to Example 1 of the invention, wherein (A) shows basic lens data, and (B) shows lens data concerning aspheric surfaces.

FIG. 8 is tables showing lens data of the wide-angle imaging lens according to Example 2 of the invention, wherein (A) shows basic lens data, and (B) shows lens data concerning aspheric surfaces.

FIG. 9 is tables showing lens data of the wide-angle imaging lens according to Example 3 of the invention, wherein (A) shows basic lens data, and (B) shows lens data concerning aspheric surfaces.

FIG. 10 is tables showing lens data of the wide-angle imaging lens according to Example 4 of the invention, wherein (A) shows basic lens data, and (B) shows lens data concerning aspheric surfaces.

FIG. 11 is tables showing lens data of the wide-angle imaging lens according to Example 5 of the invention, wherein (A) shows basic lens data, and (B) shows lens data concerning aspheric surfaces.

FIG. 12 is tables showing lens data of the wide-angle imaging lens according to Example 6 of the invention, wherein (A) shows basic lens data, and (B) shows lens data concerning aspheric surfaces.

FIG. 13 is a table showing values of Conditional Expressions in respective Examples collectively.

DETAILED DESCRIPTION OF EMBODIMENTS OF THE INVENTION

Embodiments of the invention will be described in detail with reference to the drawings hereinafter.

Figure 1:
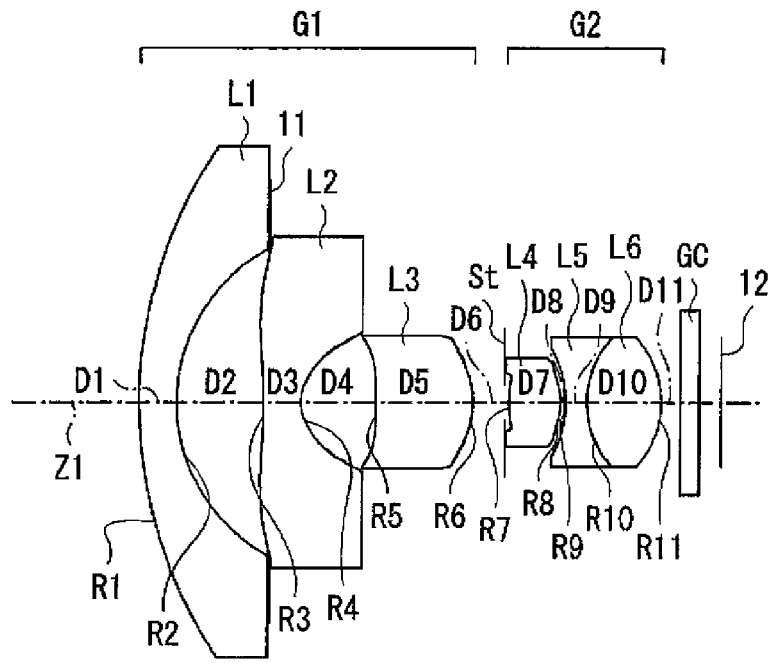
FIG. 1 is a lens sectional view showing a wide-angle imaging lens according to Example 1 of the invention.
Figure 2:
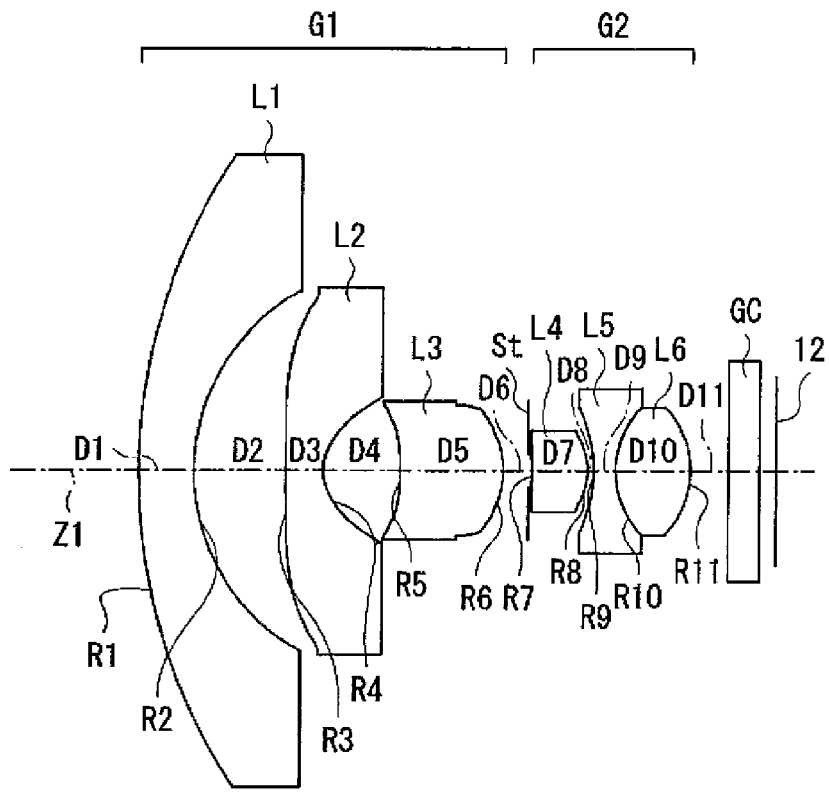
FIG. 2 is a lens sectional view showing a wide-angle imaging lens according to Example 2 of the invention.
Figure 3:
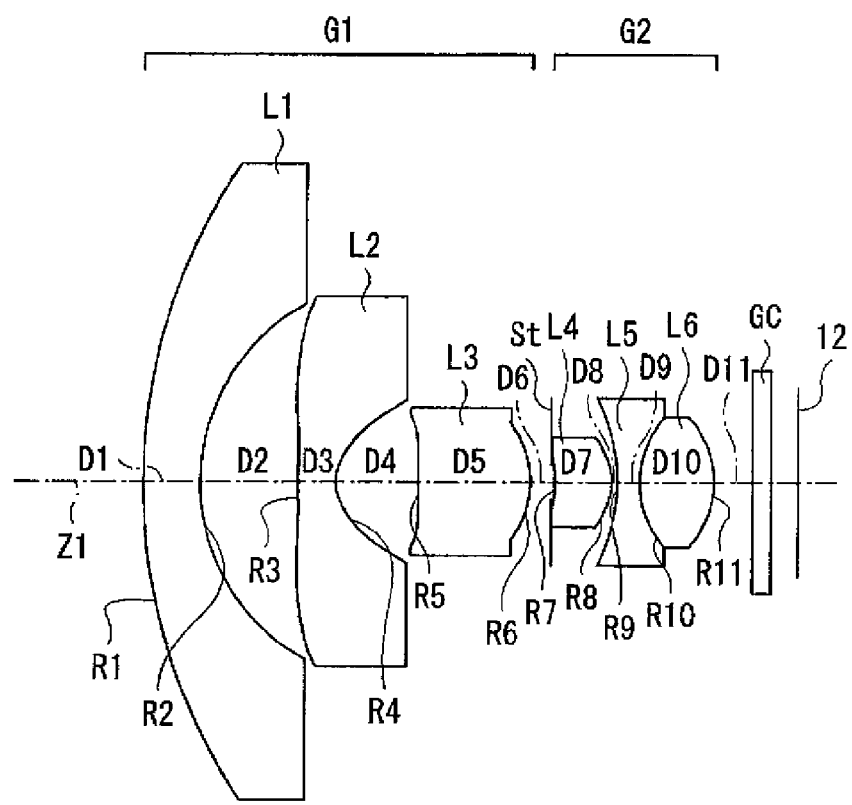
FIG. 3 is a lens sectional view showing a wide-angle imaging lens according to Example 3 of the invention.
Figure 4:
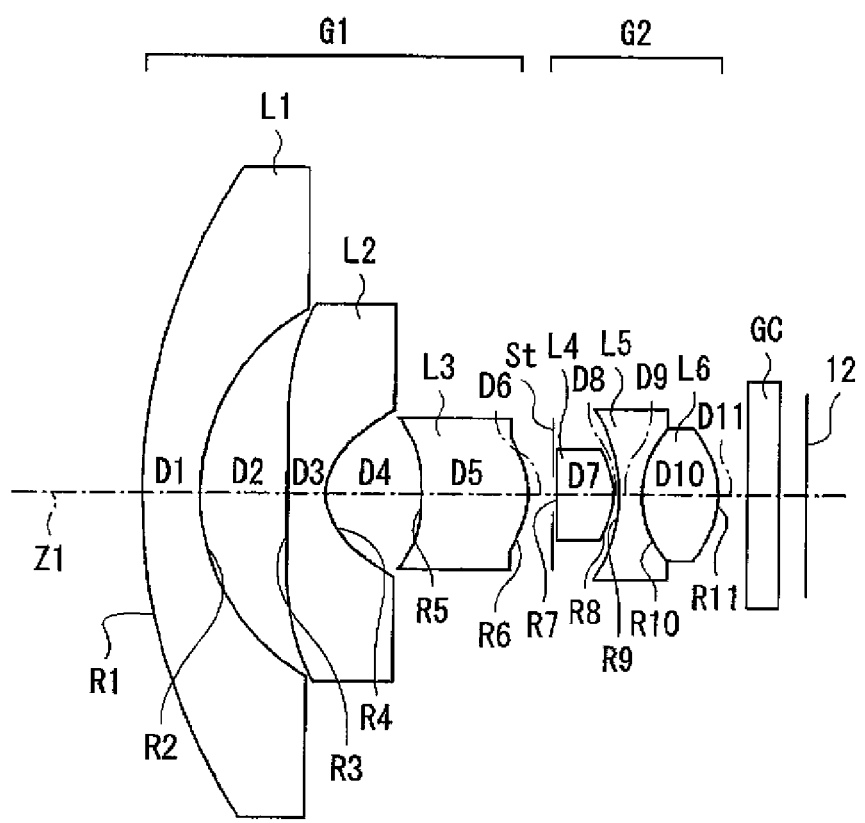
FIG. 4 is a lens sectional view showing a wide-angle imaging lens according to Example 4 of the invention.
Figure 5:
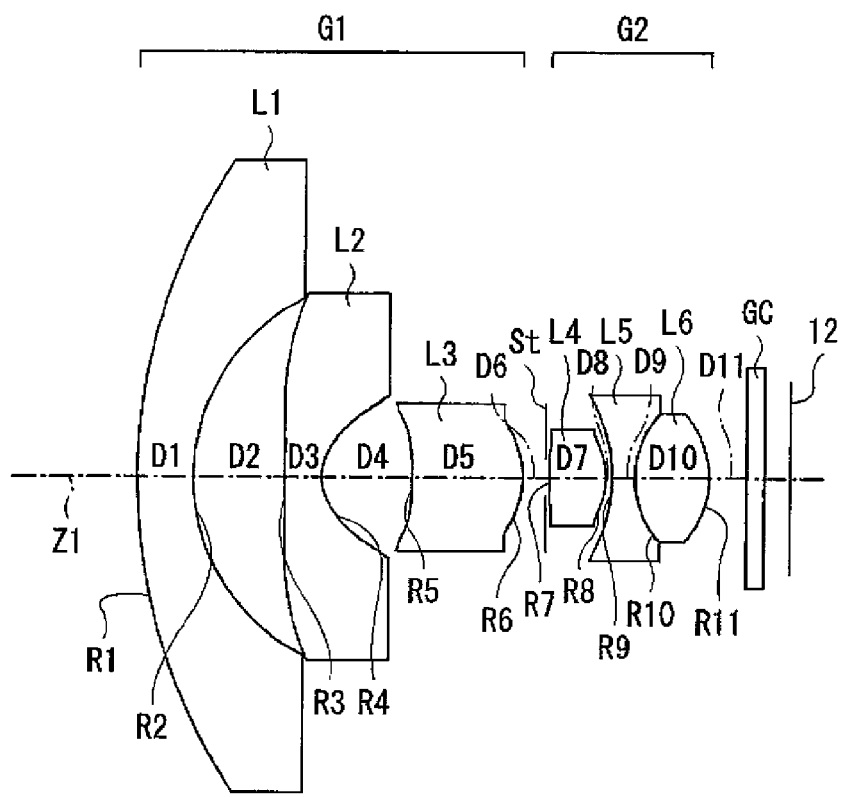
FIG. 5 is a lens sectional view showing a wide-angle imaging lens according to Example 5 of the invention.
Figure 14:
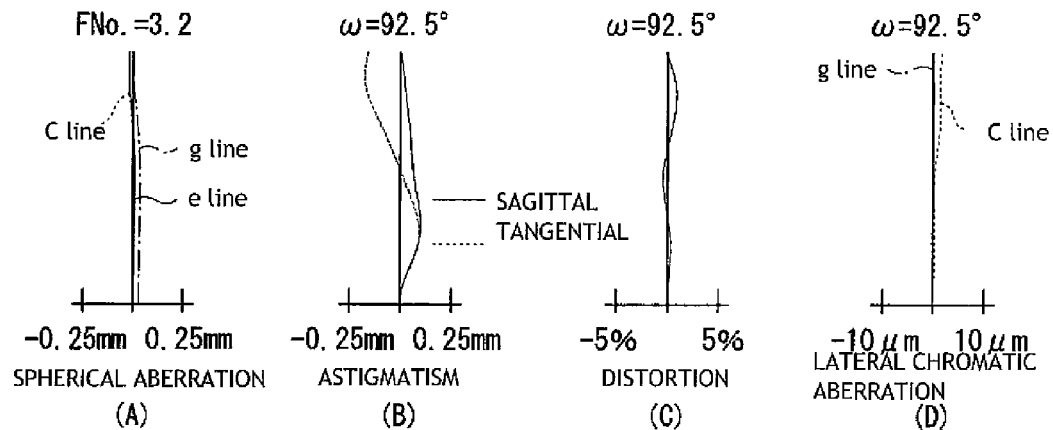
FIG. 14 is aberration charts showing various aberrations of the wide-angle imaging lens according to Example 1 of the invention, wherein (A) shows a spherical aberration, (B) shows astigmatism, (C) shows a distortion, and (D) shows a lateral chromatic aberration.

FIG. 1 shows a first configuration example of a wide-angle imaging lens according to an embodiment of the invention. This configuration example corresponds to a lens configuration of a first numerical Example (FIGS. 7(A) and 7(B)) described later. FIG. 2 shows a second configuration example, and this configuration example corresponds to a lens configuration of a second numerical Example (FIGS. 8(A) and 8(B)) described later. FIG. 3 shows a third configuration example, and this configuration example corresponds to a lens configuration of a third numerical Example (FIGS. 9(A) and 9(B)) described later. FIG. 4 shows a fourth configuration example, and this configuration example corresponds to a lens configuration of a fourth numerical Example (FIGS. 10(A) and 10(B)) described later. FIG. 5 shows a fifth configuration example, and this configuration example corresponds to a lens configuration of a fifth numerical Example (FIGS. 11(A) and 11(B)) described later. FIG. 6 shows a sixth configuration example, and this configuration example corresponds to a lens configuration of a sixth numerical Example (FIGS. 12(A) and 12(B)) described later. In FIGS. 1 to 6, a reference symbol Ri denotes a radius of curvature (mm) of an i-th surface when the surface of the constituent element positioned closest to the object side is set as a first surface and the reference is affixed with gradually increasing toward the image side (image formation side). A reference symbol Di denotes a surface separation (mm) between an i-th surface and an i+1-th surface on an optical axis Z1. It is noted that the basic configuration is similar in respective configuration Examples.

Figure 26:
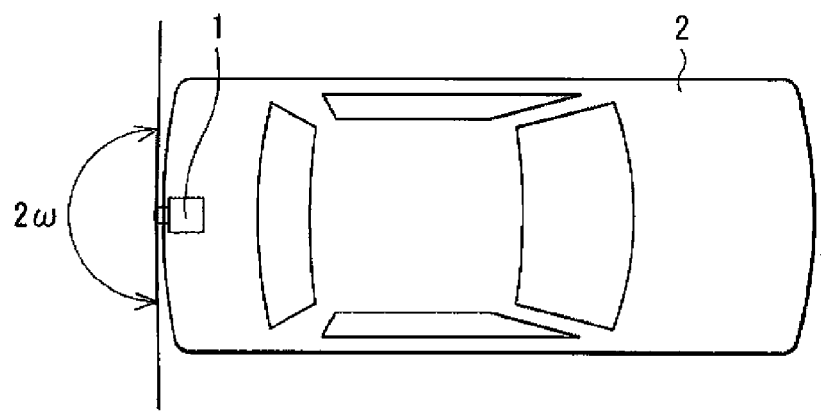
FIG. 26 is a configurative view showing a concept of a camera mounted on a vehicle, into which the camera module according to an embodiment of the invention is installed.

This wide-angle imaging lens is suitable for use in various imaging devices using an imaging element such as CCD or CMOS, for example, an in-vehicle camera, a cellular phone camera, a surveillance camera, and the like. For example, as shown in FIG. 26, the in-vehicle camera is fitted to the rear portion of a vehicle 2 and is used to surveil the rear side. Also, the in-vehicle camera is used to surveil the front side or the right or left side. In this case, it is preferable that in-vehicle camera 1 has a wider shooting angle of view 2ω because the camera can observe a wide range.

Figure 27:
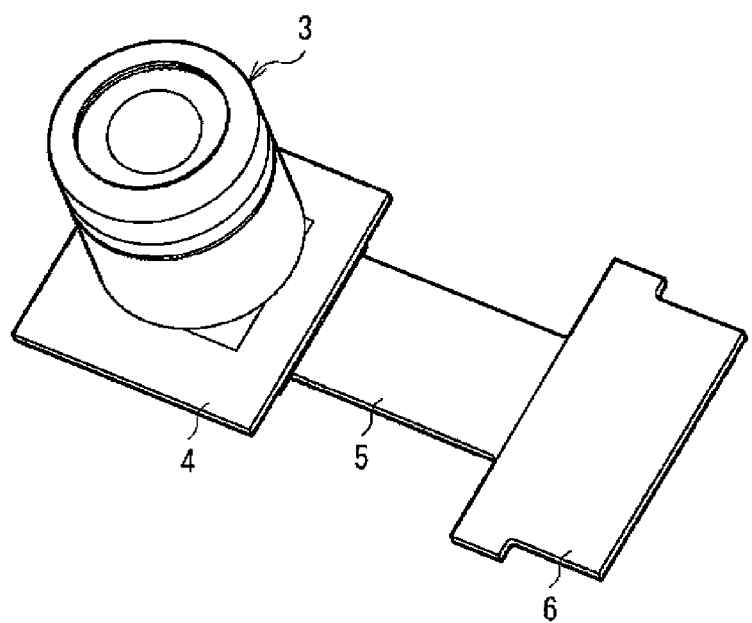
FIG. 27 is a perspective view showing a configuration example of the camera module according to an embodiment of the invention.

FIG. 27 shows a configuration example of a camera module used in the in-vehicle camera 1, or the like. This camera module has a lens barrel 3 into which the wide-angle imaging lens according to this embodiment is installed, a supporting substrate 4 for supporting the lens barrel 3, and an imaging element provided on the supporting substrate 4 in a position that corresponds to an image plane of the wide-angle imaging lens. Also, the camera module has a flexible substrate 5 electrically connected to the imaging element on the supporting substrate 4, and an external connection terminal 6 electrically connected to the imaging element on the supporting substrate 4. The external connection terminal 6 is configured to be connectable to a signal processing circuit on the camera main body side of the in-vehicle camera 1. These components are integrated.

In this camera module, an optical image formed by the wide-angle imaging lens is converted into an electrical imaging signal by the imaging device. Then, the imaging signal is output to the signal processing circuit on the camera main body side via the flexible substrate 5 and the external connection terminal 6. Here, in this camera module, the imaging signal of high resolution can be obtained by the wide-angle imaging lens according to this embodiment. In the camera main body, an image of high resolution can be generated based on the imaging signal.

As shown in FIGS. 1 to 6, the wide-angle imaging lens according to this embodiment has a first lens group G1 and a second lens group G2 in order from the object side along the optical axis Z1. An optical aperture stop St is provided between the first lens group G1 and the second lens group G2. An imaging element 12 such as CCD is arranged on the image plane of this wide-angle imaging lens. Various optical members are arranged between the second lens group G2 and the imaging element 12 according to the configuration on the camera side into which the lens is installed. For example, a flat plate-shaped glass plate GC such as a cover glass for protecting the imaging plane or an infrared cut filter is arranged.

The first lens group G1 includes a first lens L1, a second lens L2, and a third lens L3, which are arranged in order from the object side. The second lens group G2 includes a fourth lens L4, a fifth lens L5, and a sixth lens L6, which are arranged in order from the object side.

In this wide-angle imaging lens, it is concerned that a luminous flux passing through the outside of an effective aperture between the first lens L1 and the second lens L2 arrives at the images plane as a stray light to generate a ghost. In such a case, it is preferable that the stray light is cut off by providing a light shielding means in an area out of the effective aperture. The light shielding means may be realized by an opaque plate member or an opaque coating applied to the lens surface out of the effective aperture. For example, as shown in FIG. 1, an opaque coating 11 applied to the first lens L1 on the second-lens-L2 side may be used as the light shielding means.

It is preferable that at least one surface of each of the second lens L2, the third lens L3, and the fourth lens L4 is formed into an aspheric surface. More preferably, both surfaces of the respective lenses are formed into the aspheric surface. Also, it is preferable that materials of the second lens L2, the third lens L3 and the fourth lens L4 are plastic. Also, it is preferable that, when the plastic is selected as the lens material, its water absorption coefficient is equal to less than 0.3%. For example, the second lens L2 and the fourth lens L4 may be formed of polyolefin-based plastics, and the third lens L3 may be formed of polycarbonate-based or PET-based plastic.

Also, it is preferable that Abbe numbers of materials of the first lens L1 and the sixth lens L6 are equal to or larger than 40, and that Abbe numbers of the materials of the second lens L2 and the fourth lens L4 are equal to or larger than 50. Also, it is preferable that Abbe number of the material of the third lens L3 is equal to or less than 40 and that Abbe number of a material of the fifth lens L5 is equal to or less than 30.

In the first lens group G1, the first lens L1 is a negative meniscus lens having a convex surface directed to the object side. The second lens L2 is a negative lens whose surface on the image side has a concave shape. A surface of the second lens L2 on the object side has a convex shape, for example. The third lens L3 is a positive lens whose surface on the image side has a convex shape directed toward the image side. In the second configuration example shown in FIG. 2, a surface of the third lens L3 on the object side has a convex shape in the vicinity of the optical axis. In the other configuration examples, a surface of the third lens L3 on the object side has a concave shape in the vicinity of the optical axis.

In the second lens group G2, the fourth lens L4 is a positive lens whose surface on the image side has a convex shape directed toward the image side. In the first configuration example shown in FIG. 1, the fourth lens L4 is a biconvex lens whose surface on the object side has a convex shape. In the other configuration examples, the fourth lens L4 is a positive meniscus lens whose surface on the object side has a concave shape in the vicinity of the optical axis. When a surface of the fourth lens L4 on the object side is formed into a concave shape directed toward the object side or an absolute value of a radius of curvature of the surface on the object side is set larger than an absolute value of a radius of curvature of the surface on the image side, an incident angle of a luminous flux incident on the fourth lens L4 can be set relatively small, so that change in optical performances due to the manufacturing error can be made relatively small.

The fifth lens L5 is a biconcave negative lens. The sixth lens L6 is a biconvex positive lens. Also, the fifth lens L5 and the sixth lens L6 are cemented together to constitute the cemented lens. In this case, each of the fifth lens L5 and the sixth lens L6 may be constructed by a single lens rather than the cemented lens.

It is preferable that this wide-angle imaging lens satisfies Conditional Expressions (1) to (5) given as follows.

$$-4.0 < f2/f < -2.0 \quad (1)$$

$$3.5 < f3/f < 6.0 \quad (2)$$

$$-2.5 < f5/f < -1.5 \quad (3)$$

$$3.0 < fb/f < 5.0 \quad (4)$$

$$-3.0 < f12/f < -1.2 \quad (5)$$

where f denotes a focal length of the wide-angle imaging lens, f2 denotes a focal length of the second lens, f3 denotes a focal length of the third lens, f5 denotes a focal length of the fifth lens, fb denotes a composite focal length of the second lens group, and f12 denotes a composite focal length of the first lens and the second lens.

It is more preferable that Conditional Expressions (1) to (5) are set in numerical ranges given as follows.

$$-4.0 < f2/f < -2.5 \quad (1A)$$

$$3.5 < f3/f < 6.0 \quad (2A)$$

$$-2.5 < f5/f < -1.65 \quad (3A)$$

$$3.2 < fb/f < 5.0 \quad (4A)$$

$$-3.0 < f12/f < -1.4 \quad (5A)$$

Also, it is preferable that an angle of view $2\omega$ is equal to or larger than 180° and that this wide-angle imaging lens satisfies Conditional Expression (6) given as follows.

$$Y80/Y40 > 2.1 \quad (6)$$

where Y80 denotes an image height at an angle of view which is equal to 80% of a maximum angle of view, and Y40 denotes an image height at an angle of view which is equal to 40% of the maximum angle of view.

Next, an operation and advantages of the wide-angle imaging lens constructed as above will be described hereunder.

In detail, this wide-angle imaging lens relates to a fish-eye lens whose angle of view exceeds 180°, and has the distortion characteristic similar to $$Y = 2 \cdot f \cdot \tan(\theta/2)$$

where $\theta$ denotes a half angle of view, and Y denotes an image height. The normal fish-eye lens having the distortion characteristic of $Y = f \cdot \theta$ shoots subjects, which have the same size and located at an equal distance mutually from the imaging device, so that the shot subjects have equal size irrespective of directions of the subjects. Whereas the lens having the distortion characteristic similar to $Y = 2 \cdot f \cdot \tan(\theta/2)$ shoots an image of a subject in the peripheral portion of the screen where an angle-of-view is large in comparison with an image of a subject at the center portion of the screen. Therefore, this wide-angle imaging lens is suitable for the surveillance camera, the in-vehicle camera, and the like, which attach importance to a discrimination of surrounding distant subjects. When Conditional Expression (6) is satisfied, an image of a surrounding subject can be captured largely, and the performances suitable for the surveillance use or the on-vehicle use can be obtained.

According to this wide-angle imaging lens, if the second lens L2, the third lens L3, and the fourth lens L4 are formed into the aspheric lenses, respectively, the good resolution performance can be obtained even with a short total length. Also, if in the second lens group G2, the fifth lens L5 and the sixth lens L6 both being located at a remote position from the aperture stop St are constructed by the biconcave negative lens and the biconvex positive lens, respectively, this wide-angle imaging lens is advantageous in correcting a lateral chromatic aberration, and generation of the lateral chromatic aberration due to an increase of an angle of view can be suppressed. In particular, when the cemented lens consisting of the fifth lens L5 and the sixth lens L6 is arranged in a position apart from the aperture stop St, the correction of the lateral chromatic aberration can be made more effectively.

Also, if (i) Abbe numbers of the materials of the first lens L1 and the sixth lens L6 is equal to or larger than 40, (ii) Abbe numbers of the materials of the second lens L2 and the fourth lens L4 is equal to or larger than 50, (iii) Abbe number of the material of the third lens L3 is equal to or less than 40, and (iv) Abbe number of the material of the fifth lens L5 is equal to or less than 30, both an axial chromatic aberration and a lateral chromatic aberration can be corrected satisfactorily and thus, the good resolution performance can be obtained.

Also, when the plastic is selected as the materials of the second lens L2, the third lens L3 and the fourth lens L4, the aspheric shape can be realized with high accuracy, and also, the lightweight lens can be provided at a low cost. In all Examples described later, the materials of the first lens L1, the fifth lens L5 and the sixth lens L6 are an optical glass, the materials of the second lens L2 and the fourth lens L4 are a polyolefin-based plastic, and the material of the third lens L3 is a polycarbonate-based plastic. Alternatively, the materials of the third lens L3 or the fourth lens L4 may be the optical glass. In this case, a lens whose optical performances less change due to an environmental change can be provided. Upon employing the plastics, if the material having an extremely small water absorption coefficient is selected, e.g., the second lens L2 and the fourth lens L4 are formed of the polyolefin-based plastic (water absorption coefficient is 0.01% or less) and the third lens L3 is the polycarbonate-based or PET-based plastic (water absorption coefficient is 0.2%), deterioration in performances due to water absorption can be suppressed to the minimum.

When Conditional Expressions (1) to (5) (and Conditional Expressions (1A) to (5A)) are satisfied, a power balance among the respective lenses is optimized, which is advantageous in correcting various aberrations including the axial chromatic aberration and the lateral chromatic aberration. Also, generation of aberrations caused by an increase of a wide angle can be suppressed. If the conditions defined by Conditional Expressions (1) to (5) are not fulfilled, it is difficult to correct satisfactorily particularly both the axial chromatic aberration and the lateral chromatic aberration simultaneously.

If f2/f exceeds the upper limit of Conditional Expression (1), a light ray is turned sharply by the second lens L2, and thus the good distortion characteristic cannot be maintained. If f2/f falls below the lower limit, the negative power of the first lens L1 have to be enhanced in order to increase an angle of view, and thus the good distortion characteristic obtained by refracting a light ray gradually cannot be maintained. If f3/f exceeds the upper limit of Conditional Expression (2), an action of the third lens L3 for canceling the lateral chromatic aberration generated mainly by the first lens L1 and the second lens L2 becomes insufficient, and thus it is difficult to correct the lateral chromatic aberration. If f3/f falls below the lower limit, high part accuracy and high assembling accuracy are required because a light ray is turned sharply by the third lens L3. If f5/f exceeds the upper limit of Conditional Expression (3), the radius of curvature becomes small to make the processing of the fifth lens L5 difficult and also the positive power of the sixth lens L6 used together with the fifth lens L5 is increased to make the processing of the sixth lens L6 difficult. If f5/f falls below the lower limit, the axial chromatic aberration is corrected insufficiently.

If fb/f exceeds the upper limit or falls below the lower limit of Conditional Expression (4), it is hard to keep a necessary back focus while keeping the aberration in a good condition. If f12/f exceeds the upper limit of Conditional Expression (5), it is difficult to keep the aberration in a good condition while keeping the angle of view that exceeds 180°. If f12/f falls below the lower limit of Conditional Expression (5), it is difficult to obtain the image-height characteristic that is similar to $Y = 2 \cdot f \cdot \tan(\theta/2)$ by the lens whose angle of view is larger than 180°.

As explained above, according to the wide-angle imaging lens of this embodiment, the shapes, the arrangements, the refractive powers, etc. of the respective lenses are optimized by using the relatively small number of lenses, i.e., six lenses in total. Therefore, a further increase of a super-wide angle suitable for the surveillance use, the on-vehicle use, and the like can be realized in small size and light weight while maintaining the good optical performances. Also, according to the imaging device or the camera module of this embodiment, the electric signal is output in response to the optical image formed by the high-performance wide-angle imaging lens according to this embodiment. Therefore, the imaging signal of high resolution can be obtained.

EXAMPLES

Next, specific numerical Examples of the wide-angle imaging lens according to this embodiment will be explained hereunder. In the following, first to sixth numerical Examples will be explained collectively.

Tables showing specific lens data corresponding to the wide-angle imaging lens shown in FIG. 1 are shown in FIGS. 7(A) and 7(B), as Example 1. In particular, basic lens data are shown in FIG. 7(A), and data concerning aspheric surfaces are shown in FIG. 7(B). In the lens data shown in FIG. 7(A), in the column of the surface number Si, the number of an i-th (i=1 to 11) surface to which the reference is affixed with gradually increasing toward the image side is given when the surface of the constituent element located closest to the object side is set as the first surface. In the column of the radius of curvature Ri, the value (mm) of the radius of curvature of an i-th surface from the object side is given to correspond to the reference Ri affixed in FIG. 1. In the column of the surface separation Di, similarly the surface separation (mm) on the optical axis Z1 between an i-th surface Si from the object side and an i+1-th surface Si+1 is given. Also, Nej gives the value of the refractive index of a j-th (j=1 to 6) optical element from the object side with respect to e-line (wavelength 546.07 nm). In the columns of vdj, the value of the Abbe number of the j-th optical element from the object side with respect to d-line (wavelength 587.6 nm) is given.

In the wide-angle imaging lens according to Example 1, the materials of the first lens L1, the fifth lens L5, and the sixth lens L6 are the optical glass, the materials of the second lens L2 and the fourth lens t4 are the polyolefin-based plastic, and the material of the third lens L3 is the polycarbonate-based plastic. Although not shown in the lens data of FIG. 7(A), the glass plate GC having 0.5 mm in thickness is arranged between the sixth lens L6 and the image plane.

In the wide-angle imaging lens according to Example 1, both surfaces of the second lens L2, the third lens L3, and the fourth lens L4 are formed into the aspheric shape. In the basic lens data in FIG. 7(A), the numerical value of the radius of curvature in the vicinity of the optical axis is shown as the radius of curvature of the aspheric surface. In FIG. 7(B), in the numerical values given as the aspheric data, a symbol "E" denotes that a numerical value subsequent to this "E" is a "power exponent" to the base 10, and means that the numerical value preceding to this "E" is multiplied by the numerical value that is expressed by the exponential function using 10 as the base. For example, "1.0E-02" corresponds to "1.0×10$^{-2}$".

As the aspheric data, values of respective coefficients $B_n$ and K in the aspheric shape equation represented by the following Equation (A) are given. In more detail, Z denotes a length (mm) of perpendicular from a point on the aspheric surface in a position at a height Y from the optical axis Z1 to a tangent plane to a vertex of the aspheric surface (plane perpendicular to the optical axis Z1). In the wide-angle imaging lens according to Example 1, the respective aspheric surfaces are expressed by effectively using the third to twentieth coefficients $B_3$ to $B_{20}$ as the aspheric coefficient $B_n$.

$$Z = C \cdot Y^2 / \{1 + (1 - K \cdot C^2 \cdot Y^2)^{1/2}\} + \Sigma B_n \cdot Y^n \quad (A)$$

(n integral number of 3 or more)

where Z denotes an aspheric depth (mm),
  Y denotes a distance (height) from the optical axis to the lens surface (mm)
  K denotes a conical constant
  C denotes: a paraxial curvature=a 1/R
  (R Denotes a Paraxial Radius of Curvature)
  $B_n$ denotes an n-th aspheric coefficient Like the above wide-angle imaging lens according to Example 1, specific lens data corresponding to the configuration of the wide-angle imaging lens shown in FIG. 2 are given in FIGS. 8(A) and 8(B), as Example 2. Also, specific lens data corresponding to the configuration of the wide-angle imaging lens shown in FIG. 3 are given similarly in FIGS. 9(A) and 9(B), as Example 3. Also, specific lens data corresponding to the configuration of the wide-angle imaging lens shown in FIG. 4 are given similarly in FIGS. 10(A) and 10(B), as Example 4. Also, specific lens data corresponding to the configuration of the wide-angle imaging lens shown in FIG. 5 are given similarly in FIGS. 11(A) and 11(B), as Example 5. Also, specific lens data corresponding to the configuration of the wide-angle imaging lens shown in FIG. 6 are given similarly in FIGS. 12(A) and 12(B), as Example 6.

Here, in all the wide-angle imaging lenses according to Examples 2 to 6, both surfaces of the second lens L2, the third lens L3, and the fourth lens L4 are formed into the aspheric shape, like Example 1. Also, the materials of the respective lenses are similar to those in Example 1. Although omitted in the respective lens data, the glass plates GC each having a thickness of 0.85 mm, 0.5 mm, 0.85 mm, 0.5 mm, and 0.5 mm are arranged between the sixth lens L6 and the image plane in Examples 2 to 6, respectively.

In FIG. 13, the values concerning the above Conditional Expressions (1) to (5) (Conditional Expressions (1A) to (5A)) and Conditional Expression (6) in the respective Examples are given collectively. As can be seen from FIG. 13, the values in respective Examples are kept within the numerical ranges of the respective Conditional Expressions.

Figure 15:
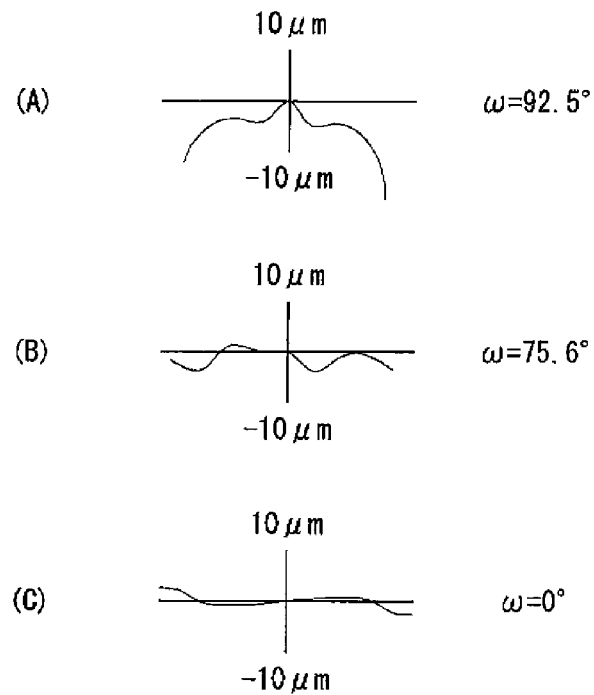
FIG. 15 is an aberration chart showing a transverse aberration of the wide-angle imaging lens according to Example 1 of the invention.
Figure 16:
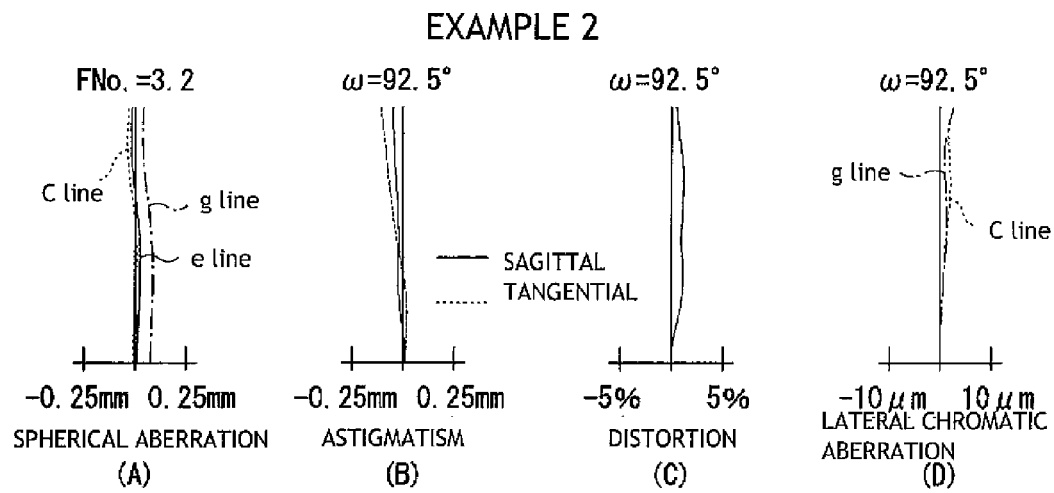
FIG. 16 is aberration charts showing various aberrations of the wide-angle imaging lens according to Example 2 of the invention, wherein (A) shows a spherical aberration, (B) shows astigmatism, (C) shows a distortion, and (D) shows a lateral chromatic aberration.
Figure 17:
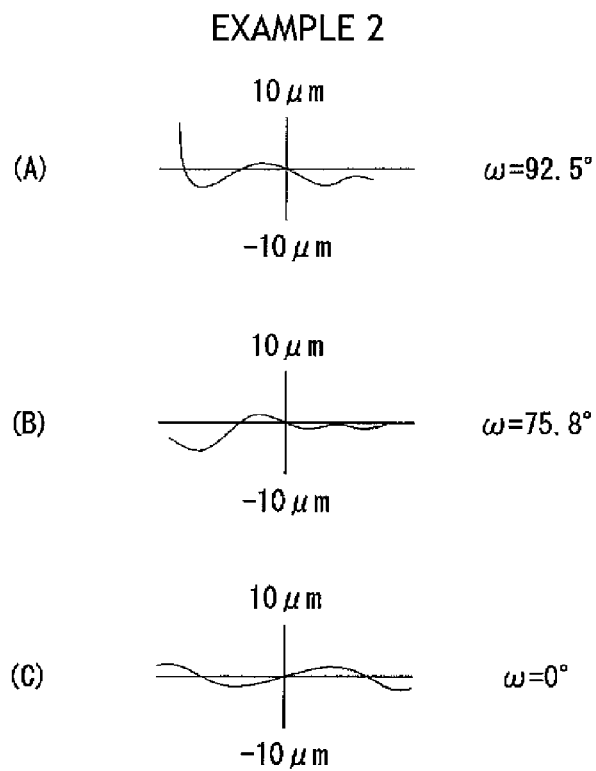
FIG. 17 is an aberration chart showing a transverse aberration of the wide-angle imaging lens according to Example 2 of the invention.
Figure 18:
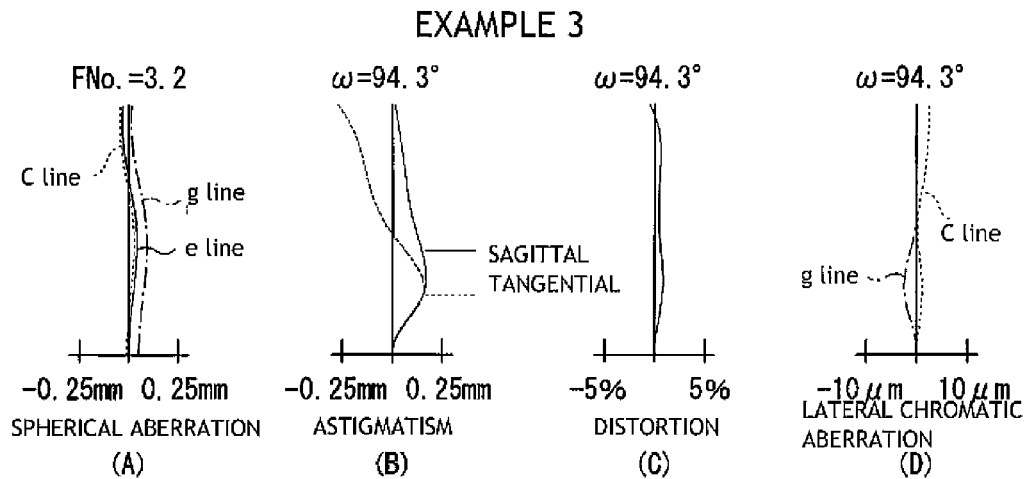
FIG. 18 is aberration charts showing various aberrations of the wide-angle imaging lens according to Example 3 of the invention, wherein (A) shows a spherical aberration, (B) shows astigmatism, (C) shows a distortion, and (D) shows a lateral chromatic aberration.
Figure 19:
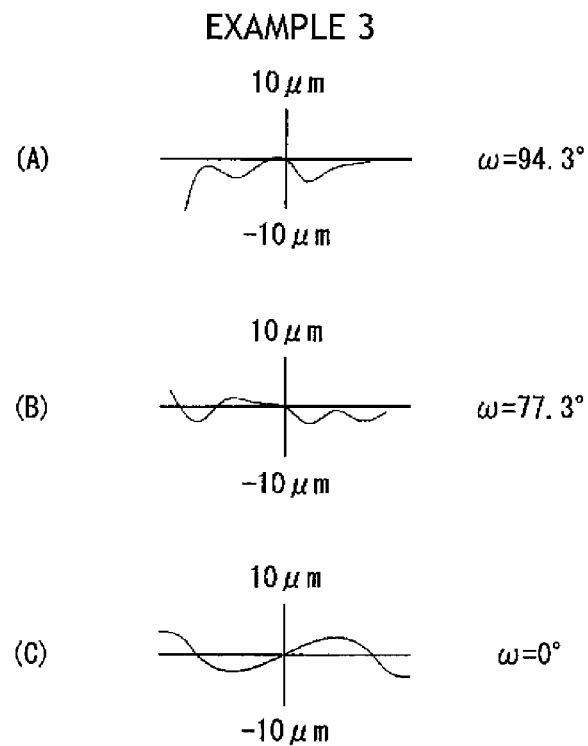
FIG. 19 is an aberration chart showing a transverse aberration of the wide-angle imaging lens according to Example 3 of the invention.
Figure 20:
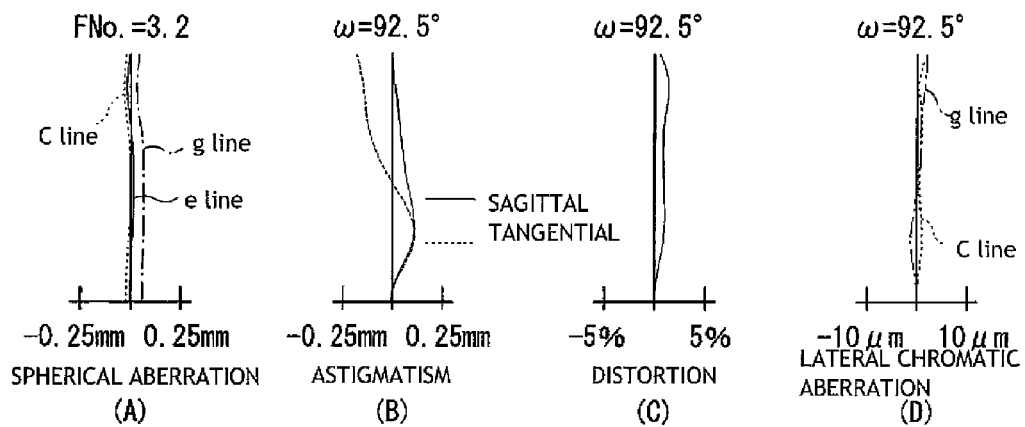
FIG. 20 is aberration charts showing various aberrations of the wide-angle imaging lens according to Example 4 of the invention, wherein (A) shows a spherical aberration, (B) shows astigmatism, (C) shows a distortion, and (D) shows a lateral chromatic aberration.
Figure 21:
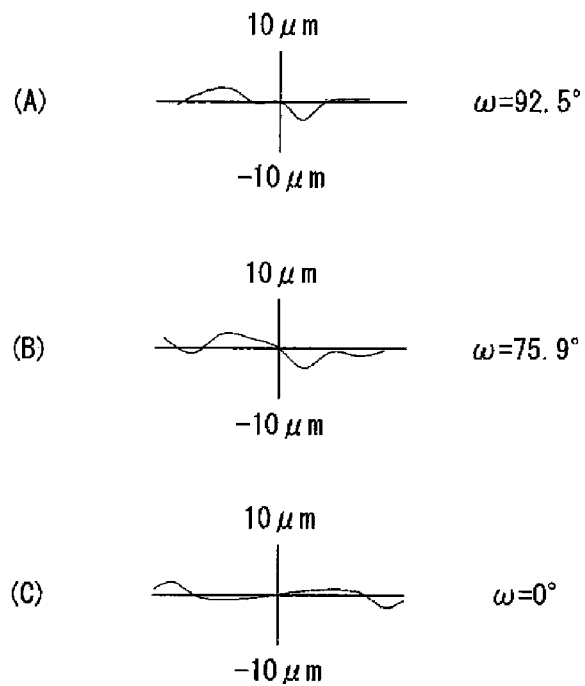
FIG. 21 is an aberration chart showing a transverse aberration of the wide-angle imaging lens according to Example 4 of the invention.
Figure 22:
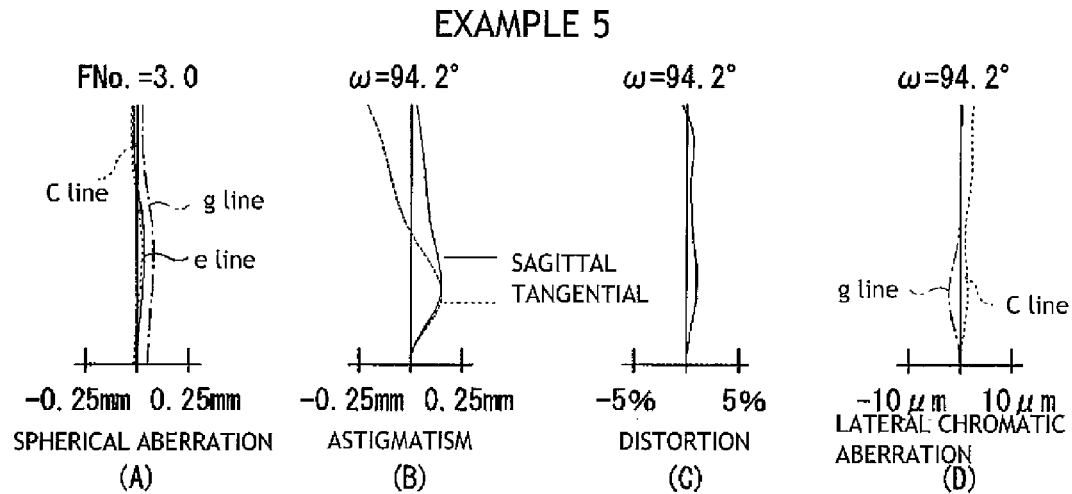
FIG. 22 is aberration charts showing various aberrations of the wide-angle imaging lens according to Example 5 of the invention, wherein (A) shows a spherical aberration, (B) shows astigmatism, (C) shows a distortion, and (D) shows a lateral chromatic aberration.
Figure 23:
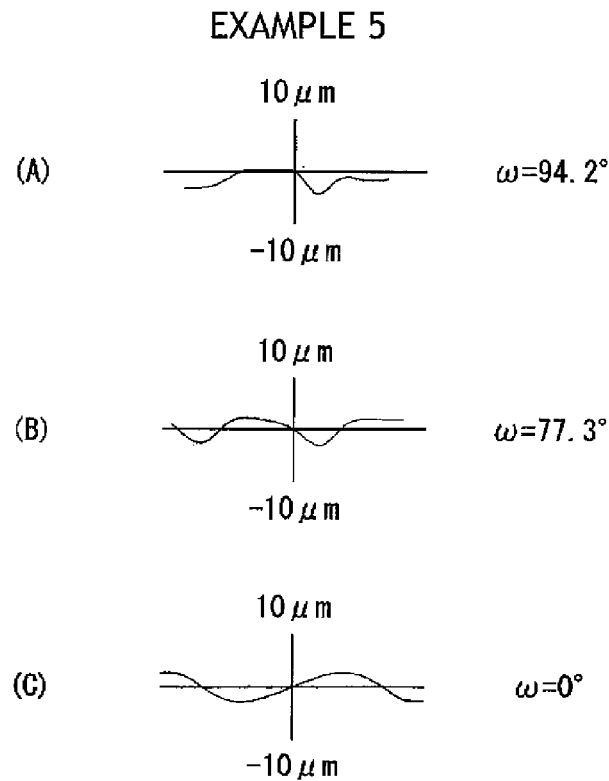
FIG. 23 is an aberration chart showing a transverse aberration of the wide-angle imaging lens according to Example 5 of the invention.
Figure 24:
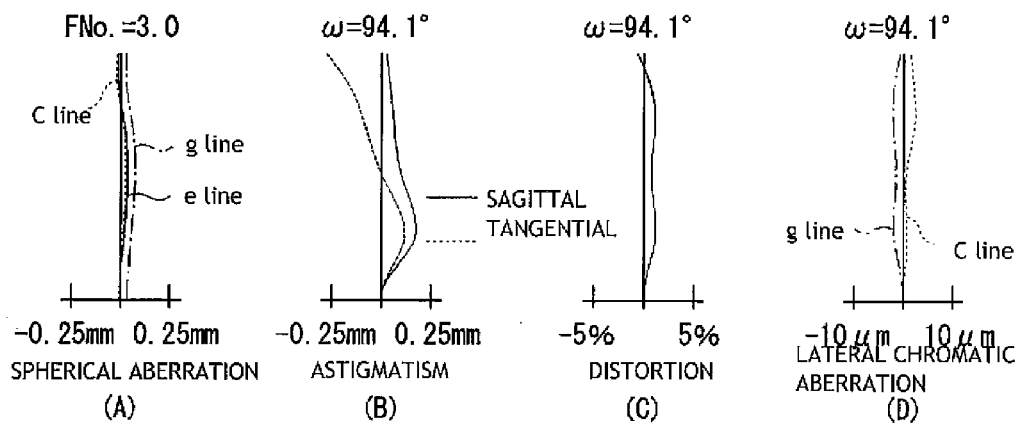
FIG. 24 is aberration charts showing various aberrations of the wide-angle imaging lens according to Example 6 of the invention, wherein (A) shows a spherical aberration, (B) shows astigmatism, (C) shows a distortion, and (D) shows a lateral chromatic aberration.
Figure 25:
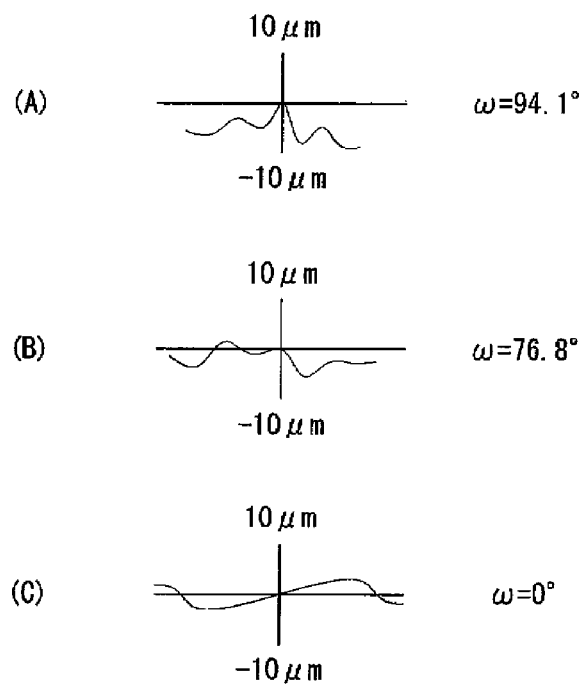
FIG. 25 is an aberration chart showing a transverse aberration of the wide-angle imaging lens according to Example 6 of the invention.

FIGS. 14(A) to 14(D) show the spherical aberration, the astigmatism, the distortion (distortion aberration), and the lateral chromatic aberration in the wide-angle imaging lens according to Example 1, respectively. Also, FIGS. 15(A) to 15(C) show the transverse aberration at respective angles of view. Each aberration chart shows the aberration obtained by using e-line as a reference wavelength. The spherical aberration chart and the lateral chromatic aberration chart also show the aberrations with respect to g-line (wavelength 435.8 nm) and C-line (wavelength 656.3 nm). In the astigmatism chart, a solid line shows the aberration in the sagittal direction and a broken line shows the aberration in the tangential direction. FNo. shows the F-number and ω shows a half angle of view. In this case, the distortion shows the aberration when Y=2·f·tan(ω/2) is employed as an ideal image height (Y denotes the image height, and f denotes the focal length of the wide-angle imaging lens).

Similarly, various aberrations of the wide-angle imaging lens according to Example 2 are shown in FIGS. 16(A) to 16(D) and FIGS. 17(A) to 17(C), and various aberrations of the wide-angle imaging lens according to Example 3 are shown in FIGS. 18(A) to 18(D) and FIGS. 19(A) to 19(C).

Similarly, various aberrations of the wide-angle imaging lens according to Example 4 are shown in FIGS. 20(A) to 20(D) and FIGS. 21(A) to 21(C), various aberrations of the wide-angle imaging lens according to Example 5 are shown in FIGS. 22(A) to 22(D) and FIGS. 23(A) to 23(C), and various aberrations of the wide-angle imaging lens according to Example 6 are shown in FIGS. 24(A) to 24(D) and FIGS. 25(A) to 25(C).

As can be seen from the respective numerical data and the respective aberration charts given above, in the respective Examples, the super-wide-angle imaging lens which is suitable for surveillance use, on-vehicle use, etc. and which has angle of view exceeding 180° can be accomplished by a six-lens configuration as a whole while maintaining good optical performances.

In this event, the invention is not limited to the above embodiment and respective examples. Various variations can be made thereto. For example, the values of the radius of curvature, the surface separation, and the refractive index of respective lens components, and the like are not limited to the foregoing values in the numerical examples, and other values may be employed.

What is claimed is:

1. A wide-angle imaging lens comprising, in order from an object side:
    a first lens group having a positive refractive power;
    an aperture stop; and
    a second lens group having a positive refractive power, wherein:
    the first lens group comprises, in order from the object side,
        a first lens that is a negative meniscus lens having a convex surface directed to the object side,
        a negative second lens whose surface on an image side has a concave shape, and
        a positive third lens whose surface on the image side has a convex shape directed to the image side, and
    the second lens group comprises
        a positive fourth lens whose surface on the image side has a convex shape directed to the image side,
        a negative fifth lens having a biconcave shape, and
        a positive sixth lens, and
    the following Conditional Expressions (1) to (5) are satisfied:

$$-4.0 < f2/f < -2.0 \qquad (1)$$

$$3.5 < f3/f < 6.0 \qquad (2)$$

$$-2.5 < f5/f < -1.5 \qquad (3)$$

$$3.0 < fb/f < 5.0 \qquad (4)$$

$$-3.0 < f12/f < -1.2 \qquad (5)$$

where f denotes a focal length of the wide-angle imaging lens,
    f2 denotes a focal length of the second lens,
    f3 denotes a focal length of the third lens,
    f5 denotes a focal length of the fifth lens,
    fb denotes a composite focal length of the second lens group, and
    f12 denotes a composite focal length of the first lens and the second lens.

2. The wide-angle imaging lens according to claim 1, wherein:
    Abbe numbers of materials of the first lens and the sixth lens are equal to or larger than 40,
    Abbe numbers of material of the second lens and the fourth lens are equal to or larger than 50,
    Abbe number of a material of the third lens is equal to or less than 40, and
    Abbe number of a material of the fifth lens is equal to or less than 30.

3. The wide-angle imaging lens according to claim 2, wherein the fifth lens and the sixth lens are cemented together.

4. The wide-angle imaging lens according to claim 3, wherein:
    an angle of view is 180° or more, and
    the following Conditional Expression (6) is satisfied:

$$Y80/Y40 > 2.1 \qquad (6)$$

where Y80 denotes an image height at an angle of view which is equal to 80% of a maximum angle of view, and Y40 denotes an image height at an angle of view which is equal to 40% of the maximum angle of view.

5. The wide-angle imaging lens according to claim 1, wherein the fifth lens and the sixth lens are cemented together.

6. The wide-angle imaging lens according to claim 5, wherein:
    an angle of view is 180° or more, and
    the following Conditional Expression (6) is satisfied:

$$Y80/Y40 > 2.1 \qquad (6)$$

where Y80 denotes an image height at an angle of view which is equal to 80% of a maximum angle of view, and Y40 denotes an image height at an angle of view which is equal to 40% of the maximum angle of view.

7. The wide-angle imaging lens according to claim 1, wherein:
    an angle of view is 180° or more, and
    the following Conditional Expression (6) is satisfied:

$$Y80/Y40 > 2.1 \qquad (6)$$

where Y80 denotes an image height at an angle of view which is equal to 80% of a maximum angle of view, and Y40 denotes an image height at an angle of view which is equal to 40% of the maximum angle of view.

8. A camera module fitted into a camera main body, the camera module comprising:
    the wide-angle imaging lens according to claim 1;
    an imaging element that outputs an electric signal in response to an optical image formed by the wide-angle imaging lens; and
    an external connection terminal that connects the imaging element to a circuit of a camera main body, wherein:
    the wide-angle imaging lens, the imaging element, and the external connection terminal are integrated together.

9. An imaging device comprising:
    the wide-angle imaging lens according to claim 1; and
    an imaging element, wherein
    the imaging element outputs an electric signal in response to an optical image formed by the wide-angle imaging lens.

* * * * *